US008328644B2

(12) United States Patent
Busey et al.

(10) Patent No.: US 8,328,644 B2
(45) Date of Patent: Dec. 11, 2012

(54) ASYNCHRONOUS CHALLENGE GAMING

(75) Inventors: Andrew Thomas Busey, Austin, TX (US); Christian Primozich, Austin, TX (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/244,936

(22) Filed: Sep. 26, 2011

(65) Prior Publication Data

US 2012/0015726 A1 Jan. 19, 2012

Related U.S. Application Data

(63) Continuation of application No. 12/275,150, filed on Nov. 20, 2008.

(60) Provisional application No. 60/989,389, filed on Nov. 20, 2007.

(51) Int. Cl.
*A63F 9/24* (2006.01)
*A63F 13/00* (2006.01)

(52) U.S. Cl. ............... 463/42; 463/29; 463/30; 463/31; 463/43

(58) Field of Classification Search .............. 463/29, 463/30, 31, 42, 43
See application file for complete search history.

(56) References Cited

U.S. PATENT DOCUMENTS

| | | | | |
|---|---|---|---|---|
| 4,951,203 A | * | 8/1990 | Halamka | 715/203 |
| 4,965,727 A | * | 10/1990 | Halamka | 715/203 |
| 5,411,259 A | | 5/1995 | Pearson | |
| 5,533,124 A | * | 7/1996 | Smith et al. | 705/57 |
| 6,200,216 B1 | | 3/2001 | Peppel | |
| 6,292,706 B1 | | 9/2001 | Birch et al. | |
| 6,735,324 B1 | * | 5/2004 | McKinley et al. | 382/100 |
| 7,204,754 B2 | * | 4/2007 | Gray et al. | 463/16 |
| 7,314,407 B1 | * | 1/2008 | Pearson | 463/7 |

(Continued)

FOREIGN PATENT DOCUMENTS

GB 2359640 A 8/2001

(Continued)

OTHER PUBLICATIONS

Arrington, Michael; Ready to Kill Some Time (and Some Enemies)? Try Duels.com; TechCrunch website: http://web.archive.org/web/20070816133427/http:/www.techcrunch.com/2007/08/06/ready-to-kill-some-time-and-some-enemies-try-duelscom/ ; avaliable online as of Aug. 16, 2007.*

(Continued)

*Primary Examiner* — N Drew Richards
*Assistant Examiner* — John P Dulka
(74) *Attorney, Agent, or Firm* — Schwegman, Lundberg & Woessner, P.A.

(57) ABSTRACT

Systems and methods to provide asynchronous challenge gaming are described. In some embodiments, a method presents multiple character actions to a first user and a second user of a game, where each of the character actions defines a game action to be performed by a character in the game. The method receives a selection from the first user and the second user that identify multiple character actions. Additionally, the method receives sequence assignments from the first user and the second user that define a sequential order for performing the character actions. The game play between the first user and the second user is displayed to the first user based on the character actions and the sequence assignments, and without further interaction with the first user or the second user subsequent to receiving the character actions and the sequence assignments.

20 Claims, 11 Drawing Sheets

U.S. PATENT DOCUMENTS

| | | | |
|---|---|---|---|
| 7,372,587 B1 * | 5/2008 | Altrieth, III | 358/1.14 |
| 7,731,589 B2 * | 6/2010 | Kataoka et al. | 463/42 |
| 7,762,893 B2 * | 7/2010 | Kando et al. | 463/37 |
| 7,862,428 B2 * | 1/2011 | Borge | 463/29 |
| 8,028,315 B1 * | 9/2011 | Barber | 725/47 |
| 2002/0142833 A1 * | 10/2002 | Tsuchida et al. | 463/30 |
| 2004/0009817 A1 * | 1/2004 | La Mura et al. | 463/42 |
| 2005/0182693 A1 * | 8/2005 | Alivandi | 705/27 |
| 2006/0003825 A1 * | 1/2006 | Iwasaki et al. | 463/2 |
| 2006/0030959 A1 * | 2/2006 | Duhamel | 700/91 |
| 2006/0189374 A1 * | 8/2006 | Olson | 463/17 |
| 2007/0275782 A1 * | 11/2007 | Kaji et al. | 463/43 |
| 2008/0026847 A1 * | 1/2008 | Mueller et al. | 463/42 |
| 2009/0149248 A1 | 6/2009 | Busey et al. | |
| 2010/0137045 A2 * | 6/2010 | Angelopoulos | 463/1 |

FOREIGN PATENT DOCUMENTS

| | | | |
|---|---|---|---|
| GB | 2359640 A | * | 8/2001 |
| JP | 08299525 A | * | 11/1996 |
| JP | 2006174916 A | * | 7/2006 |

OTHER PUBLICATIONS

Duels Official Blog; Archive for Oct. 2007; website: http://web.archive.org/web/20071030040831/http:/www.duelsblog.com/?m=200710; avaliable online as of Oct. 30, 2007.*

"U.S. Appl. No. 12/275,150, Examiner Interview Summary Mailed Feb. 16, 2012", 11 pgs.

"U.S. Appl. No. 12/275,150, Non Final Office Action mailed Sep. 15, 2011", 24 pgs.

"U.S. Appl. No. 12/275,150, Response filed Feb. 15, 2012 to Non Final Office Action mailed Sep. 15, 2011", 15 pgs.

"U.S. Appl. No. 12/831,105, Non Final Office Action mailed Mar. 5, 2012", 14 pgs.

* cited by examiner

FIG. 2

| Home | Battle | Armory | Forums | Wiki | Help | Facebook |

Warning this server is meant for Beta testing only. No items or avatar specific data will be transferred to www.duels.com

Awl Fireshy

Level 19

XP 49749
W-L: 151-141
Pwr 665 [600]

Loadouts | Action Sets

Noblestones: 100000
Gold: 1131
Tokens: 160
Items: 39 of 35 slots
Actions: 3
Packs: 1
Quests: 1
Challenges: 0
Badges: 3

Message Center

✘ Tom Tom challenged you
✘ Tunster challenges you
✘ Barry Lydon challenged you

Avatar
Skills
Battle
Account
Logout

Actions Shop

General Actions are available to all High Path avatars. Each High Path also has Actions only available to disciples of that Path.

General          Path Actions
    

| | Name |
|---|---|
|  | Anticipation |
|  | Backstab |
|  | Deadly Strike |
|  | Expose Armor |
|  | Flurry |
|  | Gouging Strike |
|  | Perfect Timing |
|  | Pinpoint Strike |
|  | Smokescren |
|  | Spellbreak |

| Home | Battle | Armory | Forums | Wiki | Help | Facebook | | Invite Friends | Become a Member | Log In |

Warning: this server is meant for Beta testing only. No items or avatar specific data will be transferred to www.duels.com

Awl Fireshy

Level 19

XP 49749
W-L: 151-141
Pwr 665 [600]

Loadouts | Action Sets

Noblestones: 100000
Gold: 1131
Tokens: 160
Items: 39 of 35 slots
Actions: 3
Packs: 1
Quests: 1
Challenges: 0
Badges: 3

Message Center ☐
✘ Tom Tom challenged you
✘ Tunster challenges you
✘ Barry Lydon

Minthras [Level 40] vs. Zakke [Level 40]

Default Viewer Narration (Set to Animation)

Minthras's Health: 2640 / 3140    Zakke's Health: 0 / 1757

[ SKIP TO END ] [ VIEW ANAMATION ]

Minthras WINS

- Minthras loses one attack.
- Zakke deals 121 direct damage.
- Zakke suffers 364 fire damage from the explosion.
- Zakke plays Mind Blast: Deals 25% of the user's Intelligence in direct damage and causes your opponent to lose one attack.
- Minthras plays Holy Hand Grenade: Deals between 1 and 500 fire damage to your opponent.
- Zakke regenerates 53.
- Minthras hits Zakke for 85 damage.

Minthras was awarded:
 Gold: 3
 Tokens: 3

Zakke was awarded:
 Tokens: 2

Baseball BOSS

| THE BALLPARK | OWNER'S BOX | MARKETPLACE | CARD CATALOG | LEAGUES | | FORUMS CHAT BLOG HELP |

▷ JROID

Open Challenges: 26
Unlocked Milestones: 0

▷ MY MESSAGES (10)

Mashed Potato Smooth challenge...
Gahn challenged you

▷ MY FRONT OFFICE

Tickets: 800
Challenge Coins: 59
Cards: 348/500

Trades: 1
Auctions: 66
Packs: 0

▷ MY TEAMS

Foul Tips
Class: A

Create Team

CARD CATALOG

MY COLLECTION

Spire:: 1957 Spire:: #1 Hank Aaron

HANK AARON
Ht: 6'0"  Wt: 180lbs  Bats: R
Born: 2/5/1934  Throws: R
Home: Mobile, AL

1957

| SKILL | POWER |
|---|---|
| POWER: | 150 |
| PATIENCE: | 101 |
| CONTACT: | 114 |
| SPEED: | 82 |
| DEFENSE: | 99 |
| SPLIT: | 112/97 |

TEAM: MILWAUKEE BRAVES
POSITION: RIGHT FIELD
SALARY: $17MM
TIER: 5

Hank Aaron  *right field*
MILWAUKEE BRAVES

Card Catalog Home

Owners  Auctions

KCollins1304
BushLeague
Walter Johnson
Omaha Blue

You Own: 1 copy

RELATED CARDS

COMMENTS

FIG. 9

FIG. 11

ASYNCHRONOUS CHALLENGE GAMING

RELATED APPLICATIONS

This application is a continuation of and claims the benefit of priority under 35 U.S.C. §120 to U.S. patent application Ser. No. 12/275,150, filed on Nov. 20, 2008, which claims the benefit of priority under 35 U.S.C. §119(e) to U.S. Provisional Patent Application Ser. No. 60/989,389, filed on Nov. 20, 2007, the benefit of priority of each of which is claimed hereby, and each of which are incorporated by reference herein in their entirety.

TECHNICAL FIELD

The invention relates generally to video games and more particularly to player-versus-player and player-versus-computer strategic games.

BACKGROUND

Video games are becoming increasingly popular with the proliferation of gaming consoles and personal computers. Modern video games provide options for a user to choose and even personalize his or her gaming characters. These characters are then pitted against other programmed game opponents or against characters of networked opponents. Such games typically require simultaneous game play by opponents, including prior coordination of game times or selection from currently online opponents. Player-versus-player games generally require simultaneous, engaging play-by-play interaction.

SUMMARY

According to one aspect, the invention features a method of challenge game play including providing for selection by a first user, multiple character actions defining at least one offensive or defensive action to be performed by the character; providing a sequence assignment feature for assigning a sequential order to multiple selected character actions; and displaying asynchronous game play between the first user and a second user according to the first and second user's respective selected character actions and sequence assignments.

In one implementation, carrying out game play includes varying the effect of a selected action according to a character characteristic of at least one of the user character and an opponent character.

In another implementation, character characteristic includes at least one of a skill level, power level, health level, opposing action, weapon, protection, ability, speed, and strength.

According to another aspect, the invention features asynchronous game play between a user and an opponent.

In one implementation, carrying out game play includes conducting opposing user action sequences to determine an outcome of the game play.

In another aspect, the invention features saving a user's selection of actions and sequence assignment as an action loadout for subsequent selection by the user.

Another implementation provides for pairing of character equipment with selected character actions.

Another implementation provides a prepackaged sequence of actions for selection by a user. Still another implementation provides a prepackaged sequence of actions and combination of equipment for selection by a user.

In another aspect, the invention features permitting the user to test the selected actions and sequence assignments against an opponent's selected actions and sequence assignments prior to actual competitive game play.

In one embodiment, multiple character actions include providing enhanced performance. In other embodiments, the method includes limiting use of an action to at least one of a maximum usage count, maximum or minimum frequency count, mutual exclusion with another action, use with predetermined character equipment, use with a maximum or minimum character characteristic level, use against an opposing character having a maximum or minimum character characteristic level.

In yet another aspect, the invention features allowing a user to select between viewing the outcome of the game play and viewing progressive stages of the dueling game play. In some embodiments, the method includes running a simulation of game play without altering a lasting character characteristic.

Another aspect of the invention features a method of game play including providing a selection of virtual trading cards, each card defining a set of characteristics of the respective character. The user forms a team of characters from the selection of virtual character trading cards and selects an opposing team for game play. Game play sequences are displayed to the users of each team, without further user interaction, according to rules defining the interaction of cooperating and opposing characters as a function of characteristics assigned to each character trading card.

In some applications, carrying out game play is asynchronous such that first and second users associated with the opposing teams can observe the game play at different times.

In some cases, a team is selected from a prearranged deck of virtual character trading cards. In some cases, the cards have definite, predetermined characteristics such that the user need only select the virtual trading cards for a particular game play session and the game play is carried out without further player intervention. A user can form multiple teams or squads using multiple decks.

In some applications, sequential game play between different opposing teams is conducted in a tournament format with the characteristics of the respective virtual trading cards being updated after each round of the tournament.

In some cases, selection of a leader of a team alters the characteristics of other team characters or the effect of the characteristics of other team characters during game play.

In some applications, the opposing team is composed of historic sports players and the characteristics of the virtual trading cards are based on historic data. In some cases, the opposing team is composed of historic sports players according to historic team rosters for a season, game, or inning. In some cases, the outcome of a given game play sequence or competition is determined by statistical probabilities as a function of the historic data.

In some applications, a characteristic associated with a virtual trading card is diminished by the frequency of play of the virtual trading card, and the duration of play of the virtual trading card.

In some cases, the virtual trading cards of each team are randomly ordered to determine pairing of opposing characters in a game play segment. In other cases, the virtual trading cards of each team are preordered by the respective user such that opposing characters are paired according to user selected ordering in a game play segment. In other cases, characters are assigned positions on a team.

In some cases, the user can preload actions, abilities and equipment for individual characters. In other eases, the user can preselect teams of characters with preloaded relative abilities. In some cases, the players' relative abilities are variable depending on the team makeup. For example, a team of characters can have different characteristics, (e.g., abilities, actions, defenses, probabilities of success or equipment) with different leaders.

According to one implementation of aspects of the invention, a computer readable medium contains program instructions for carrying out a method of asynchronous game play. The method includes providing a selection of virtual character trading cards, each card defining a set of characteristics of each respective character; allowing a user to form a team of characters from the selection of virtual character trading cards; allowing a user to select an opposing team for game play; and displaying to the user and a second user of the opposing team, without further user interaction, game play sequences between the two opposing teams according to rules defining the interaction of cooperating and opposing characters as a function of characteristics assigned to each virtual character trading card. In some cases, the play can be displayed asynchronous to the users.

According to another implementation of aspects of the invention, a computer readable medium contains program instructions for carrying out a method of prearranging gaming character capabilities, including providing for selection by a user, multiple character actions each defining at least one action to be performed by the character, providing a sequence assignment feature for assigning a sequential order to multiple selected actions, and displaying game play according the user's selected actions and sequence assignments, without further user interaction. In some cases, the play can be displayed asynchronous to the users.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2 is a screenshot showing an equipment and action loadout pane.

FIG. 3 is a screenshot showing actions available for inclusion in a loadout.

FIG. 4 is a screenshot showing a challenge animation pane in which opposing characters carry out the actions and turns of the challenge.

FIG. 5 is a screenshot showing a narration of the turns of a game play session.

FIG. 8 shows one embodiment including a collection of baseball player characters available for assembly into a team.

FIG. 9 shows a virtual player trading card including player characteristic data.

FIG. 11 is a screenshot of a league competition feature pane.

The figures depicted herein are intended to aid the reader's understanding of various features of the invention disclosed herein. Accordingly, the drawings are for illustration only.

DETAILED DESCRIPTION

Aspects and features of the invention may be implemented in any number of computer games or gaming environments including action games, sports games, fantasy sports games, role playing games, player versus player strategic games, first person shooter games, episodic games, multiplayer games, real-time strategy games and the like. Aspects and features of the invention are described herein in the example context of a player versus player strategic challenge game.

Figure 1:
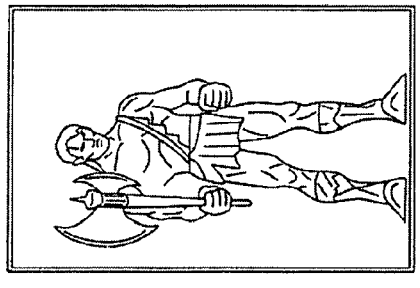
FIG. 1 is a screenshot showing a game character viewing pane with character characteristic data.

With reference to FIG. 1, a user creates a character and proceeds to acquire, build or buy various character attributes or characteristics such as strength, speed, intelligence, ability, performance, equipment, perception, stamina, resistance, health, power, skill and the like. A character or action is a user's in-game customizable persona with a name and a distinct appearance. This persona may be defined by build, gender, race, class and any number of physical appearance characteristics. Users may also personalize characters with titles, accessories, visual backgrounds, histories and the like. Each character has a number of attributes or characteristics that represent his or her person and define the character's skills, performance, abilities, talents, or "Stats."

Figure 2:
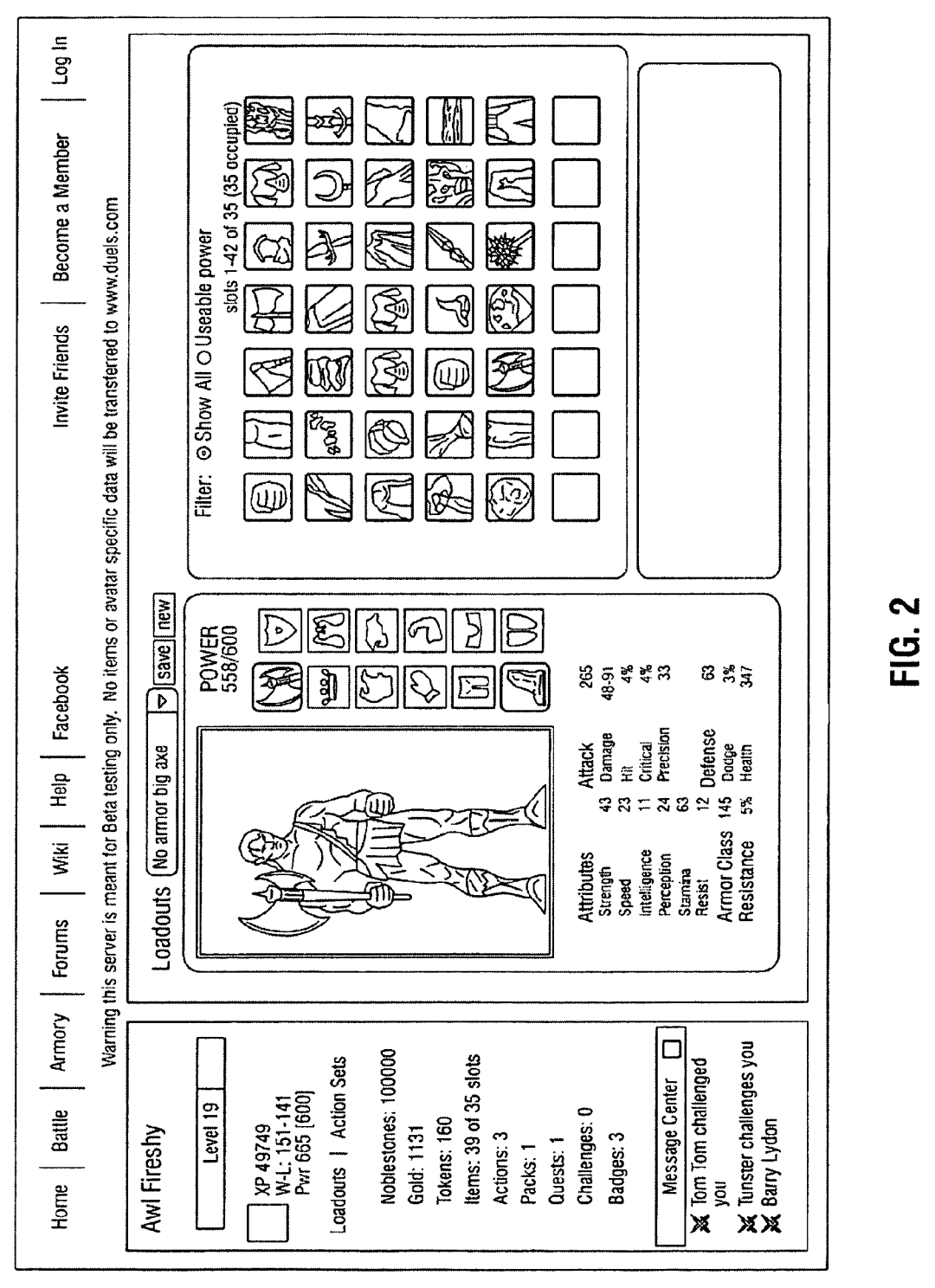

With reference to FIG. 2, in preparation for a game or other challenge, users equip a character in one embodiment via a "Loadout" pane by acquiring powers, actions and equipment from an inventory such as an "Armory". As users equip the character, some items can change the appearance or other characteristics of the character. FIG. 3 illustrates examples of actions that can be added to a characters load out.

As illustrated in FIG. 2, a character viewing pane displays the various combinations of equipment and actions selected by a user. Such prearranged selections of equipment and/or actions are referred to as "loadouts." The user may also select various combinations of actions to be performed by his or her character.

As illustrated in FIG. 2, a user may further select the order or sequence of such actions in an action loadout. A loadout may be saved, edited, named or deleted and a user may select from various saved loadouts for different stages of game play against different opponents. Users may purchase additional inventory space to permit more equipment, weapons, armor, actions and the like to be selected for a given loadout.

It can be advantageous to save multiple layouts for flexibility between challenges. Characters that use the same loadout in every fight are predictable and easy to defeat, while creating multiple loadouts allow for greater versatility. For example, a character may possess both a "standard" loadout and a loadout with high-defense gear for fighting more advanced characters.

Users may acquire actions, abilities or equipment by conquest or may simply buy actions, abilities or equipment, such as weapons and armor. Users may be required to select a particular type of equipment to master for a given character path of progression. Mastery of this equipment and increasing in performance levels may allow a user to select additional equipment "Paths" to master.

In one embodiment, an Equipment Loadout is a set of equipment (Weapons, Armor, Scrolls, etc.) that users chose for a specific challenge. It is a preconfigured, customizable fighter's kit used to implement a specific strategy. For example, if a user issues a challenge to a fighter who favors slow blunt weapons like maces and hammers and is heavily clad in plate, a lightweight, fast character with a Loadout that best exemplifies quickness is preferred—light armor, buckler, rapier and scrolls that keep an opponent immobilized during Turns.

A character's Attributes can also be tuned to maximize potential in different areas such as agility, brute force, and powers. Skills and Action or Event Loadouts may be coordinated with the Equipment Loadout. Loadout options increase as a user gains more power and game currency. Each time a user gives or accepts a challenge, the game allows him or her to pick Loadouts to use for that challenge.

A character's Loadout/Inventory page lists different Loadout equipment or action slots with a Level requirement or points requirement that must be met before an action weapon or armor can be added. For example, an action, weapon or piece of armor that would cause a user to exceed a maximum power or point level could not be used regardless of slot availability. For example a "usable power" indicator identifies all items in inventory available with currently available power, reducing the need for trial and error in equipping. Equipment and abilities or actions may be prepackaged into "packs" for purchase by users. A pack can contain items for users to sell, trade or employ in battle.

Each characteristic may be augmented by successful game play or by purchase. For example, a user may start with 10 pieces of game currency per character for purchasing weapons, armor or other character equipment. Action or the quantity of equipment may be limited by different character characteristic levels. Similarly different actions and equipment require different levels of power, health or skill to use.

Two different types of challenges allow users to elect competitive game play or practice game play for strategy evaluation. "Skirmishes" or scrimmages may not count towards player records but provide opportunities for training, learning and point accumulation without jeopardizing player records or characteristic levels. Users may browse through other user's characters to select an opponent for a skirmish or challenge.

A challenge is extended to an opponent and, if accepted, leads to a duel or competition that shows up on both contestants' public records, impacts rankings and ladders, and gives the best rewards and the most experience points. Repetition of a challenge with the same player can provide experience and currency, but at lesser amount.

A skirmish is a practice challenge, typically lasting fewer rounds and using streamlined options. A challenger can choose to skirmish anyone that has an active character. Skirmishes are automatically accepted and resolved instantly. Both fighters receive a small amount of experience and sometimes currency. Skirmishes may not appear on the official record of either character.

In either type of challenge one side will achieve victory and the other will be defeated. Each fighter in a challenge will receive either a victory prize or a consolation prize and some amount of experience points. There are also benefits for challenging different types of characters. Badges are available for defeating a certain amount of each type of fighter. At the end of each light experience points are awarded to each character.

In one embodiment, users are provided options of different levels or "paths," which are similar to skills in most role-playing games. When a character or character reaches a predetermined level, the user can choose a particular path for future game play.

With reference to FIGS. 2-3, users are provided with various action selections. Action sequence ordering adds additional strategy considerations to game play. Additional strategy considerations include different levels of efficacy and outcomes as a function of a user's or opponent's character characteristics. For example, in various implementations, actions provide different efficacy levels or different likelihoods of success as a function of the relative power, skill, health, weapons or armor of the opponents.

In other implementations, actions are absorbed, blocked or resisted by an opponent. Still in other implementations, actions are limited to a number of uses, a combination of actions and equipment, a cool down number of turns between uses, responding to a particular action of an opponent or to a limited duration. In various embodiments, actions produce a direct effect such as weakening the health of an opponent or may produce an indirect effect such as weakening the efficacy of other actions of an opponent. In other embodiments, character attributes or characteristics are variable as a function of the makeup of a team of characters, for example, depending on the leader or size of the team.

Defensive actions may negate an opponent's action, provide recovery from an opponent's action, block, resist or absorb an opponent's action or weaken an opponent. Both defensive and offensive actions may have varying degrees of efficacy as a function of any combination of user or opponent characteristics.

In some implementations, actions are completed instantly when activated and are then finished. Other actions have a prerequisite action or condition and may thus have a delayed or prolonged effect. Prolonged effects or persistent actions include character actions, skills or abilities that continue even while other actions or abilities are in use. Most actions and abilities that stack or are additive are generally persistent. Persistent actions or abilities may last for a set number of turns, for an entire round, for an entire challenge, or for any part thereof. Constant skills can remain in effect until canceled.

Different actions, skills, and abilities may be set to remain in effect for an entire challenge and may be irrevocable by a user. Actions or skills that discount characteristics or permanently affect game mechanics outside of the actual combat are passive. Some actions or abilities may negate the benefits of other actions or abilities, such as passive effects of actions or abilities which resume when the negating duration ends. Example passive events include predicting an opponent's actions or increasing the accuracy of other actions. Some skills and actions are additive while others are mutually exclusive.

A victorious character or team may receive equipment, points or game currency from the defeated character or team. Such rewards can be converted into game currency, trading cards, better equipment, more inventory space, special abilities and the like. Game currency can be bought to use in the game environment using real money, for example via PAYPAL payment systems and services.

Figure 4:
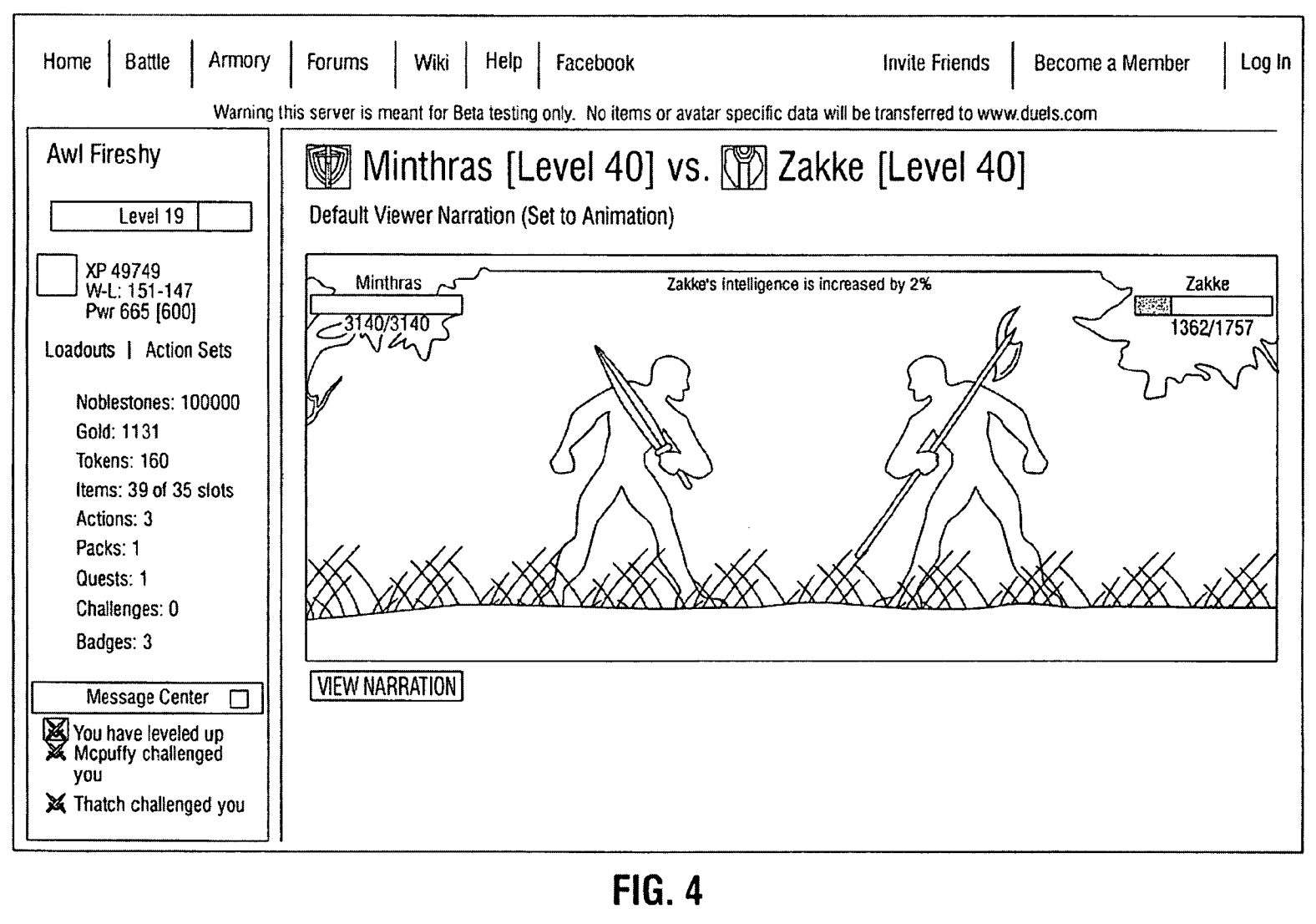

With reference to FIGS. 4 and 5, a user may choose to view a game play as an animation or as a narration of turns, game play segments and outcomes. The animation plays out each of the opponent's loadouts and assigns outcomes as a function of preprogrammed criteria. In the context of competition with historic sports figures, historic data can be used to determine the outcome of successive play to determine the outcome of a game. The narration shows a step by step or blow by blow progression of the competition through to completion. The champion character is awarded various tokens, other game currency or additional game advancement opportunities.

Accordingly, game play may be asynchronous with opposing users initiating, responding to, completing, viewing and evaluating their respective game play stages and outcomes at entirely different times. Users can elect to view the outcome of a complete challenge or game, view the outcome of different innings, or watch the game play out step by step. In other embodiments, multiple competing users may concurrently interact with the gaming system.

Users may sell or trade an action, equipment item or even a player that they have acquired through conquest, purchase or game play advancement. Some actions, equipment or players may be available exclusively by one of purchase, conquest, chance or combined pack purchase.

By winning duel challenges, scrimmages and skirmishes, a character, player, team or team owner earns experience points and gains character levels and increases in attributes and skills. Skill points determine what types of performance, equipment (i.e., weapons) are best fit for a character. Level advances or "leveling up" increase a user's stats (such as "power") and the accumulation of points or currency. As users level up, more advanced guests and opponents become available. Some characteristics such as power may be gained only by leveling up (i.e., 50 power per level).

Attributes describe to what extent a character possesses natural, in-born physical and mental characteristics common to all characters in the game. They affect character attributes and influence the chance to succeed. The six main character attributes are advanced as the character moves up in level—points are allocated by the player. Physical attributes include strength, speed, and stamina, while mental attributes can include intelligence, perception, and resistance.

Strength is a measure of a character's physical powers and is calculated into attack rating, damage, and health. Speed can determine the inherent ability to react and move as a measure of the quickness and agility of a character. It can influence attack rating, defense rating, precision, and resistance and can be a factor in determining who strikes first in a skirmish or challenge. Stamina represents a character's overall toughness. The hither the stamina the more health a character can gain. Perception is the degree of a character's awareness of the surroundings. Perception allows for attack initiative, attack rating, precision, and resistance. Intelligence measures the sharpness of a characters' mind and can govern the damage of attacks.

Power can be divided into two interrelated components: i.e. current power and maximum power. Power can place limitations on the use of higher-level equipment, affect the makeup of loadouts and the like. Power increases different amounts for different levels. For example, if a character grows from level 2-3 it might go up by 10, but if one goes from level 20-21 it may go up by 100. This is because there is much more experience needed to level up.

Certain skills change the amount of power required to wield a certain weapon. For example, a chosen path reduces the cost of equipment within that path and increases the effectiveness of equipment within that path. Additional equipment features may be provided within a path, such as ambidextrous use, increased chances of desired outcome, increased efficacy, additive rather than exclusive use, or augmented character attributes during use. The victory prize for a challenge can be a pack of character cards, abilities or equipment; other times can be game currency such as points, gold and tokens.

Skills can make a character more effective than other characters. They represent the individual areas of practical and special knowledge possessed by a character. Skills are in addition to the base abilities of a character. Combinations of skills provide substantial and evolving opportunities to create new strategies, especially when combined with equipment. Skills can have a range of duration i.e., constant, instant, persistent, and passive.

Figure 6:
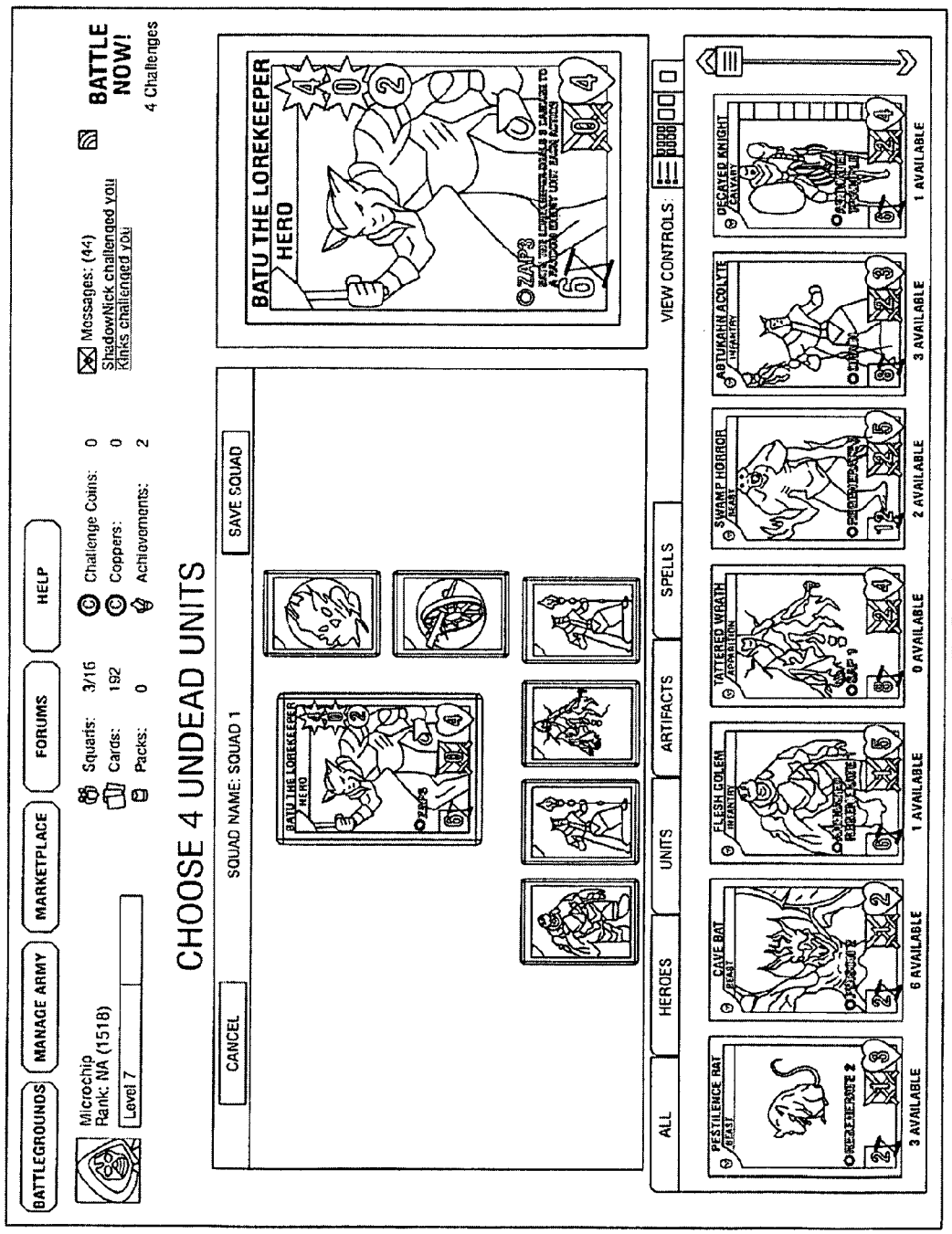
FIG. 6 is a screenshot showing characters arranged into squads or teams for group competitions.
Figure 7:
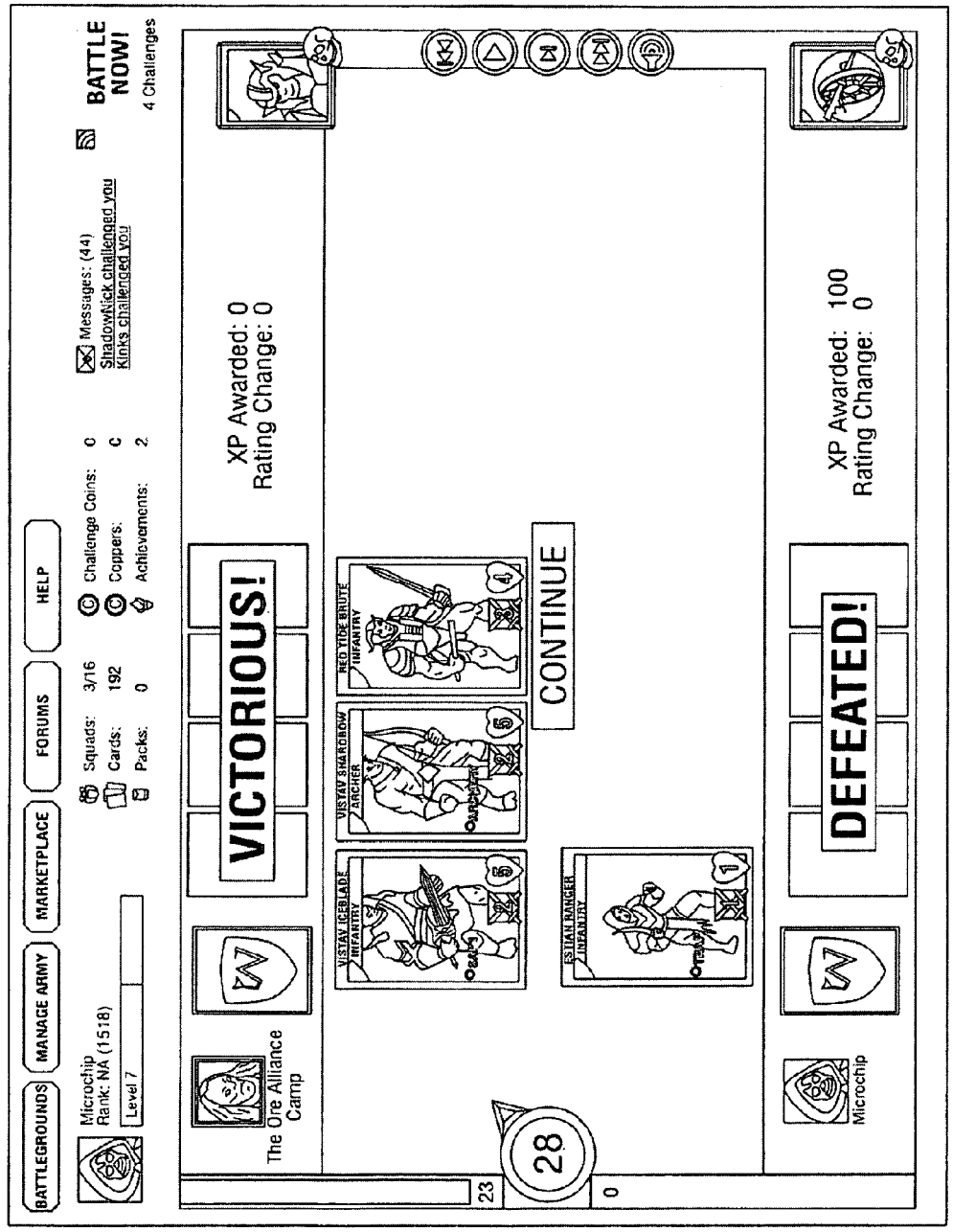
FIG. 7 is a screenshot showing a completed challenge between opposing teams.

With reference to FIGS. 6-7, characters can be arranged into squads or teams for group competitions. For example, leaders, players, offensive characters, defensive characters and supporting characters can be arranged into a squad to challenge other squads in a sports game or battle. Action or equipment loadouts can be created for each character on a team. Additionally or alternatively, characters can come with preset abilities, attributes or characteristics such as historic performance data based on real life players in a sports context.

With reference to FIG. 7, squads or teams can compete based on the relative characteristics, actions, equipment, defense and the like of the opposing characters and teams in a give game play session. Animations and/or narratives can be provided for interaction between individual opponents as well as between entire teams. For example, in a battleground context, individual duals as well as entire battles can be viewed as an animation with or without a narrative. The narrative can be written or audible and may include tactile feedback if desired.

Figure 8:
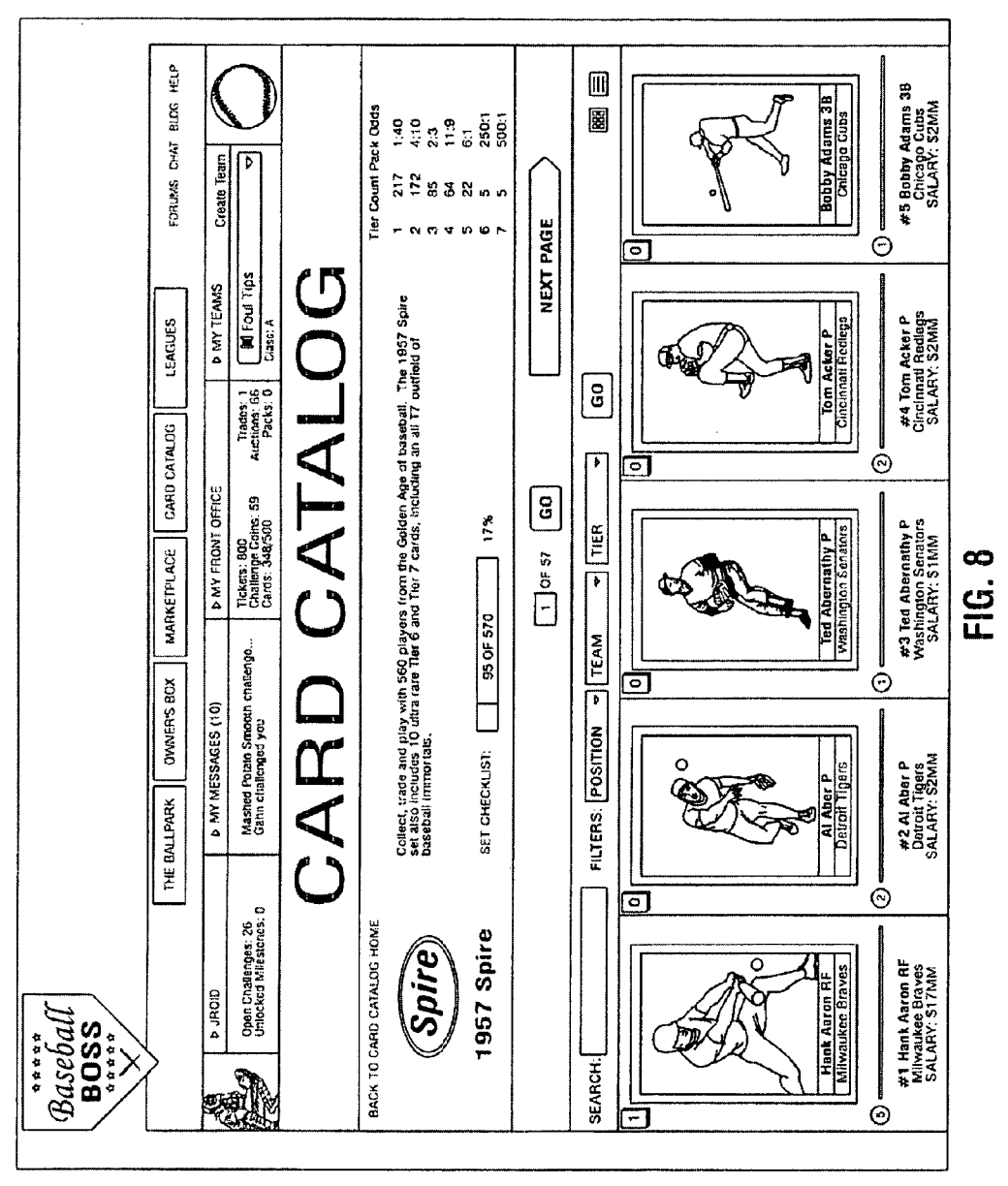

With reference to FIG. 8, one embodiment of challenge game play combines fantasy baseball features and virtual baseball card collecting. Users can assemble a team from a collection of available virtual trading cards. Virtual baseball trading cards can be purchased or exchanged with other players received as a prize for winning a game.

User can select competition with other players' teams or with historic teams. Team roster data is displayed including: Team Name, Salary, Batting Record, Pitching Record, Defense Record and team Formation Date. Game play can be in the context of a single competition, a league competition or a scrimmage.

Scrimmaging provides a way to test a team's capabilities against another team. Team owners can scrimmage an opposing team without the opposing team owner accepting a challenge invitation. Scrimmages may not be counted against a win-loss record. Points may still be awarded to the winner of a scrimmage.

Competition can be between teams from different historic leagues, tiers, divisions or eras. Similarly, users can assemble players into teams from different leagues, divisions, tiers and eras. Alternatively, a particular tournament may be set up to only allow players from a given league, division or era.

One embodiment of a challenge game allows garners to collect and trade virtual baseball cards and assemble them into fantasy teams. The teams can be used to challenge other player-created or historic teams. The owner of the winning team earns points, which can be used to purchase additional packs of player trading cards.

With reference to FIG. 9, the first side of the card displays the picture, name and position of the player. The back of the card lists a number of player characteristics or attributes. In a particular example, the card lists power, patience, speed, contact, and defense attributes. Higher power produces extra base hits. Patience measures the ability to draw walks. Higher contact rating produces more ball hits in batting. Speed determines the number of bases run or stolen. Higher defense ratings allow a player to steal more hits from an opposing team. A split rating can determine performance against left and right handed pitchers.

Individual cards can include position-specific attributes. For example, a pitcher card can include pitching characteristics such as: Miss, Stuff, Endurance, Control, Sink and Split. Miss rating determines the pitcher's strike-out ability. Stuff ratings determine the reduction of efficacy of an opponent's hits. Endurance rating determines how far a pitcher can pitch into the game. Control rating determines the number of free passes granted to the opposing team. Sink rating determines the number of fly balls and ground ball outs. Split determines the pitchers effectiveness against left and right-handed players.

Figure 10:
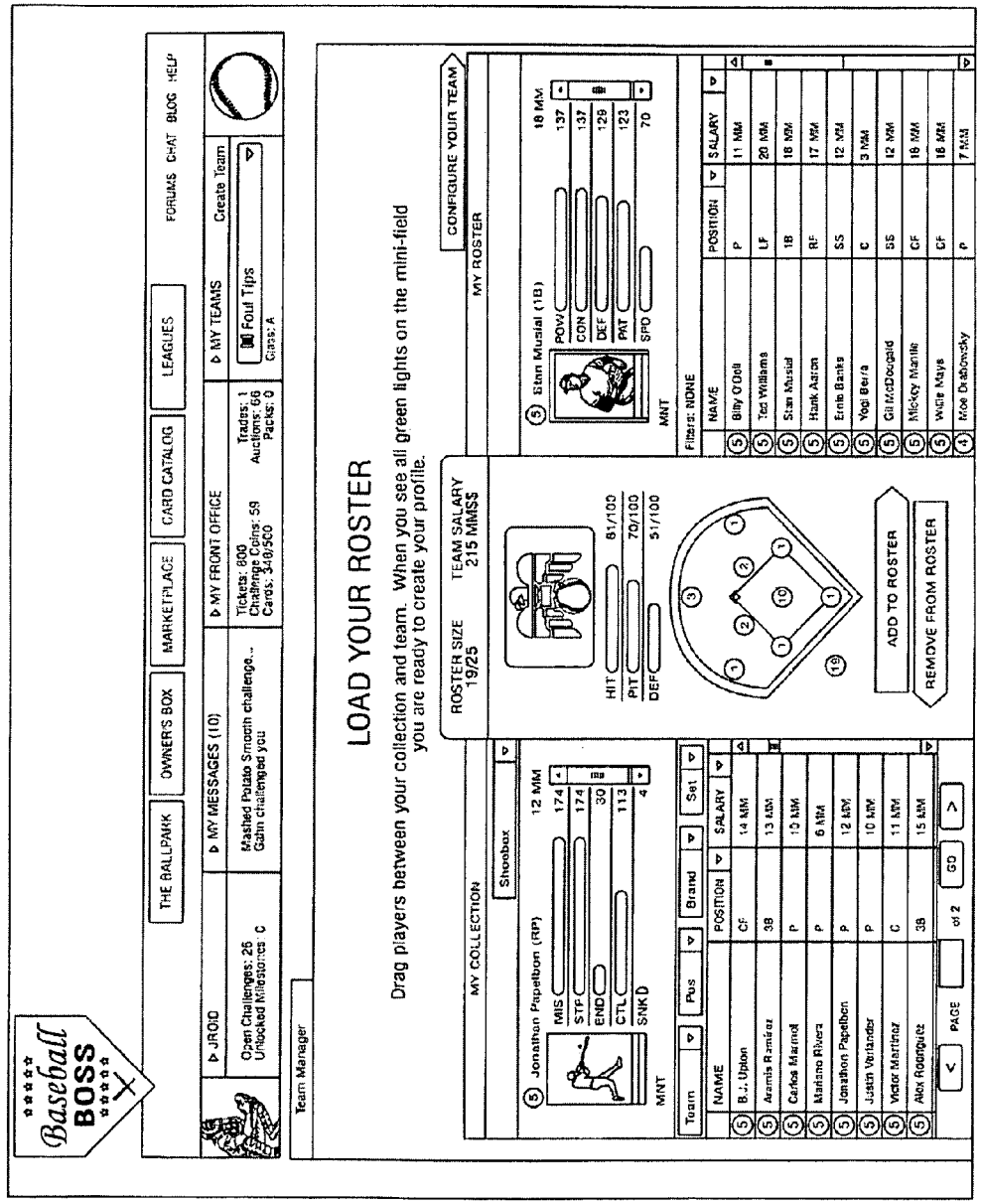
FIG. 10 shows a team management screen including trading cards for players available for assembly into a team and a team roster.

With reference to FIG. 10, team owners control the team roster through a team management page or dashboard. Team owners can view other teams to select an opponent. Owners can manage their card collection including buying, selling and trading cards. A team owner assembles a team by moving cards from a card collection to a team roster. The team owner can set the lineups and rotation of team members. Owners can acquire addition cards to supplement a team or to create additional teams. For example, an owner can create a small payroll team, an all old timers team or an all Hall of Famers team.

A roster can include multiple pitchers to adjust liar degradation of pitcher cards as the pitchers experience fatigue within a challenge series. A starter pack can be provided upon registration of a team owner. The owner can formulate a team from the starter pack alone, or can add to the team by collecting other cards. Currency is accumulated through continued game play and as prizes for winning league competitions and the like.

Team makeup can be limited by player salaries and a team owner's currency. Player salaries can be adjusted based on performance. Different classes of cards can be used to establish different salaries and degradation rates for individual players.

Upon registration, a user can designate his or her favorite major league team. The user can receive a starter pack of assorted virtual player trading cards. The majority of the pack cards are selected form a chosen team's selected year roster. Players from other eras can be mixed in with current team rosters. Users can acquire additional cards or card packs to augment their teams. Cards can be acquired from other players as with traditional card collecting. For example, a particularly desirable card with a higher assigned point value can be traded for multiple trading cards with lower point values through a player to player marketplace.

Trading cards can be purchased with game currency or by trading with other card collectors. For example, users can buy packs of live cards using accumulated points or game currency. Game currency can be earned through successful game play, scrimmages, milestone participation, or by purchase. Collecting of the virtual trading cards can be diversified with different series, brands, card layouts and the like. Different card series can be provided with different player characteristics, such as the rate of card degradation (i.e., mint, near mint, excellent, down to poor). Degradation of the card can result in decreased player performance and card condition can be restored using game currency.

A trading card auction house page can allow players to put cards up for auction and to bid on cards that others have listed. Milestones may be provided by the game administrator for varied levels of participation with corresponding awards of game currency. Classes are used similar to leagues with winning teams moving up in class standings.

The team owner can use collected cards to put together the team(s). The team owner can assign multiple players per position and select a full pitching staff. Once the team is assembled, the owner can challenge other owners, as well as computer-managed historical teams, e.g., teams from 1907, 1957, and 2007. Game play limits can be used to establish a maximum number of times two teams can play per day or per series.

The game is simulated asynchronously to the team owners based on the relative characteristics of each player and team and the winner receives points, tickets or other game currency based on the game outcome. Game currency is used to collect additional player trading cards. Cards can be purchased as packs, boxes or cases, or as individual cards at an auction or trading page.

Figure 11:
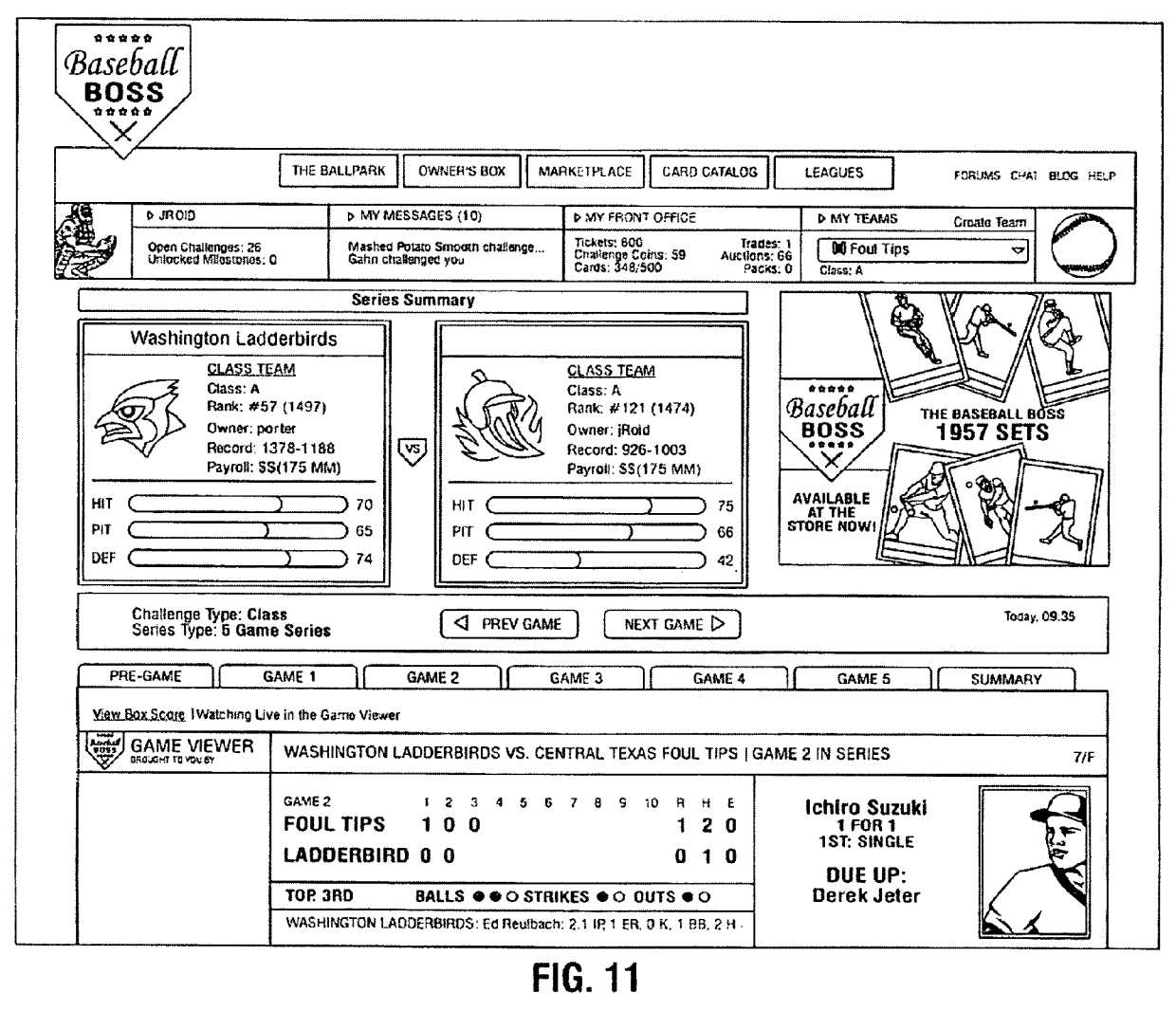

With reference to FIG. 11, game play can be limited to two teams or can be expanded to league and division play. Additional rewards for advancement in such game play are rewarded by additional points. Competition leagues can be established by different team owners with owner established rules, such as the makeup of teams. Leagues can be public and open to any other team owner. Alternatively, leagues can be private with participation only by invited teams. Owners can create multiple teams to enroll in a league and tournament organizers can create any number of tournament brackets. Tournament rules and properties can be selected by the tournament organizer according to any number of historic, current or fantasy league sports rules, e.g., single elimination and the settlement.

Joining a league can be free or can require an entrance fee to create a prize pool for the winning teams. Prizes can include game currency or additional cards. A team can be formed for play in a single league with the winning team owners receiving the trading cards for the players assembled in the winning team.

Similarly, leagues can be designated as "private" to require an invitation from the league creator or commissioner to join. This allows friends to create a limited pool for playing as a group. Leagues can be set to last a limited number of days.

Additional contests can be provided by the game administrator or arranged between groups of team owners. For example, team owners can create prizes based on prediction of real world MLB® (Major League Baseball) game outcomes. For example, a user can guess how many total runs will be scored in a real game to receive a prize pack of trading cards.

While aspects and features of the invention have been described in the example context of role play dueling and baseball, these aspects and features may be readily applied in any number of other games. For example, equipment and actions may be selected and ordered by a user to create prearranged loadouts for a football or soccer game, wrestling match or dance competition. Different player performance characteristics may be asserted for an inning, game, or season on a player or team basis. Additional alternative game actions include ejecting a coach or player, causing or avoiding an injury, starting a fight or other penalty action and the like. The online challenge games can be accessed and played on any personal computer or mobile device, including cellular phones.

A number of embodiments of the invention have been described. Nevertheless, it will be understood that various modifications may be made without departing from the spirit and scope of the invention.

Accordingly, other embodiments are within the scope of the following claims.

What is claimed is:

1. A computer-implemented method comprising:
presenting a plurality of character actions to a first user of a game and a second user of the game, each of the plurality of character actions defining an in-game action to be performed by a character in the game;
receiving a selection from the first user that identifies a first plurality of character actions to be performed by a first character associated with the first user;
receiving a sequence assignment from the first user that defines a sequential order for performing the first plurality of character actions;

receiving a selection from the second user that identifies a second plurality of character actions to be performed by a second character associated with the second user;

receiving a sequence assignment from the second user that defines a sequential order for performing the second plurality of character actions; and displaying to the first user asynchronous game play between the first user and the second user, the asynchronous game play being based on the selected character actions and the sequence assignments, the asynchronous game play being displayed without further interaction with the first user or the second user subsequent to receiving the selections of the character actions and receiving the sequence assignments.

2. The computer-implemented method of claim 1, wherein the in-game action is an offensive action.

3. The computer-implemented method of claim 1, wherein the in-game action is a defensive action.

4. The computer-implemented method of claim 1, further comprising displaying the asynchronous game play to the second user at a time that is different from the time the asynchronous game play is displayed to the first user.

5. The computer-implemented method of claim 1, wherein displaying the asynchronous game play to the first user includes displaying the asynchronous game play as an animation.

6. The computer-implemented method of claim 1, wherein displaying the asynchronous game play to the first user includes displaying the asynchronous game play as a narration of a plurality of game play events.

7. The computer-implemented method of claim 1, further comprising varying an effect of the character actions selected by the first user based on at least one characteristic determined by the second user.

8. The computer-implemented method of claim 7, wherein the characteristic determined by the second user includes at least one of a skill level, power level, health level, opposing action, weapon, protection, ability, speed, strength and historic performance.

9. The computer-implemented method of claim 1, further comprising saving the selected character actions and the sequence assignment for subsequent selection by the first user.

10. The computer-implemented method of claim 1, further comprising presenting a plurality of character equipment to the first user for use with the selected character actions.

11. The computer-implemented method of claim 1, wherein the presenting a plurality of character actions to the first user includes presenting at least one prepackaged sequence of character actions to the first user.

12. A computer-implemented method comprising:
presenting a plurality of character actions to a first user and a second user of a game, each of the plurality of character actions defining an in-game action to be performed by characters in the game;

receiving a selection from the first user that identifies a first plurality of character actions to be performed by a game character associated with the first user;

receiving a selection from the second user that identifies a second plurality of character actions to be performed by a game character associated with the second user;

receiving a first sequence assignment from the first user that defines a sequential order for performing the first selected character actions;

receiving a second sequence assignment from the second user that defines a sequential order for performing the second selected character actions;

displaying to the first user, at a first time, game play between the first user and the second user, the game play being based on the first and second selected character actions and based on the first and second sequence assignments, the game play displayed to the first user without further interaction with the first user subsequent to receiving the selection of the first plurality of character actions and receiving the first sequence assignment; and displaying to the second user, at a second time, game play between the first user and the second user, the game play being based on the first and second selected character actions and based on the first and second sequence assignments, the game play displayed to the second user without further interaction with the second user subsequent to receiving the selections of the second plurality of character actions and receiving the second sequence assignments.

13. The computer-implemented method of claim 12, wherein the presenting a plurality of character actions to the first user and the second user includes presenting at least one prepackaged sequence of character actions to the first user.

14. The computer-implemented method of claim 12, wherein displaying the game play to the first user includes displaying the game play as an animation.

15. The computer-implemented method of claim 12, wherein displaying the game play to the first user includes displaying the game play as a narration of a plurality of game play events.

16. A non-transitory machine-readable storage medium comprising instructions that, when executed by one or more processors of a machine, cause the machine to perform operations comprising:
presenting a plurality of character actions to a first user of a game and a second user of the game, each of the plurality of character actions defining an in-game action to be performed by a character in the game;

receiving a selection from the first user that identifies a first plurality of character actions to be performed by a first character associated with the first user;

receiving a sequence assignment from the first user that defines a sequential order for performing the first plurality of character actions;

receiving a selection from the second user that identifies a second plurality of character actions to be performed by a second character associated with the second user;

receiving a sequence assignment from the second user that defines a sequential order for performing the second plurality of character actions; and displaying to the first user asynchronous game play between the first user and the second user, the asynchronous game play being based on the selected character actions and the sequence assignments, the asynchronous game play displayed without further interaction with the first user subsequent to receiving the selections of the character actions and receiving the sequence assignments.

17. The non-transitory machine-readable storage medium of claim 16, wherein presenting a plurality of character actions to the first user includes presenting at least one prepackaged sequence of character actions to the first user.

18. The non-transitory machine-readable storage medium of claim 16, the machine further performing operations comprising displaying the asynchronous game play to the second user at a time that is different from the time the asynchronous game play is displayed to the first user.

19. The non-transitory machine-readable storage medium of claim 16, wherein displaying the asynchronous game play to the first user includes displaying the asynchronous game play as an animation.

20. The non-transitory machine-readable storage medium of claim 16, wherein displaying the asynchronous game play to the first user includes displaying the asynchronous game play as a narration of a plurality of game play events.

\* \* \* \* \*

UNITED STATES PATENT AND TRADEMARK OFFICE
CERTIFICATE OF CORRECTION

| | |
|---|---|
| PATENT NO. | : 8,328,644 B2 |
| APPLICATION NO. | : 13/244936 |
| DATED | : December 11, 2012 |
| INVENTOR(S) | : Busey et al. |

It is certified that error appears in the above-identified patent and that said Letters Patent is hereby corrected as shown below:

In the Claims

In column 13, line 2, in Claim 18, before "the machine", insert --wherein--, therefor Signed and Sealed this
Fourth Day of November, 2014

Michelle K. Lee
*Deputy Director of the United States Patent and Trademark Office*